United States Patent [19]

Tamura et al.

[11] Patent Number: 4,921,932

[45] Date of Patent: May 1, 1990

[54] POLYAMIDE RESIN

[75] Inventors: Mitsuhiko Tamura; Masaaki Miyamoto; Hidemi Nakanishi; Takayoshi Tanaka, all of Kitakyushu, Japan

[73] Assignee: Mitsubishi Kasei Corporation, Tokyo, Japan

[21] Appl. No.: 228,515

[22] Filed: Aug. 5, 1988

[30] Foreign Application Priority Data

Aug. 12, 1987 [JP] Japan ................................ 62-201564

[51] Int. Cl.$^5$ ............................................... C08G 69/34
[52] U.S. Cl. .................................. 528/339.3; 528/318; 528/324; 528/336; 528/338; 528/339; 528/340
[58] Field of Search ..................... 528/339.3, 318, 324, 528/336, 338, 339, 340

[56] References Cited

U.S. PATENT DOCUMENTS 3,776,865 12/1973 Glaser et al. ...................... 528/339.3
4,045,389 8/1977 Drawert et al. .................. 260/18 N
4,778,843 10/1988 Cooperman et al. ............ 528/339.3

Primary Examiner—Harold D. Anderson
Attorney, Agent, or Firm—Oblon, Spivak, McClelland, Maier & Neustadt

[57] ABSTRACT

A copolyamide resin containing a dimerized fatty acid as a copolymer component, which has (1) at least 25 equivalent %, based on the total number of terminal groups, of hydrocarbon groups having from 6 to 22 carbon atoms at its terminals, (2) a content of a dimerized fatty acid of from 0.1 to 40% by weight based on the total amount of the resin, and (3) a melt viscosity as measured at 240° C. of from 2,000 to 15,000 poise.

14 Claims, No Drawings

POLYAMIDE RESIN

BACKGROUND OF THE INVENTION

1. Field of the Invention

The present invention relates to a polyamide resin. More particularly, the present invention relates to a polyamide resin which has excellent moldability, releasability and impact resistance at low temperatures and which exhibits little change in the physical properties upon absorption of water.

2. Discussion of Background

As a polyamide resin having excellent impact and water resistance, a polyamide resin wherein a dimerized fatty acid is used as a copolymer component, is known (Japanese Unexamiend Patent publication No. 71191/1979). However, such a polyamide resin is not fully satisfactory with respect to the moldability, particularly the releasability, and a further improvement has been desired.

SUMMARY OF THE INVENTION

The present inventors have conducted extensive research to solve the above problems and as a result, have found that by introducing certain specific terminal groups at the molecular terminals of the polyamide resin wherein the dimerized fatty acid is used as a copolymer component, it is possible to substantially improve the moldability, particularly, the releasability, of the polyamide resin without impairing various desirable properties specific to the polyamide resin. The present invention has been accomplished on the basis of this discovery.

Namely, it is an object of the present invention to provide a polyamide resin having a high industrial value.

The present invention provides a copolyamide resin containing a dimerized fatty acid as a copolymer component, which has (1) at least 25 equivalent %, based on the total number of terminal groups, of hydrocarbon groups having from 6 to 22 carbon atoms at its terminals, (2) a content of a dimerized fatty acid of from 0.1 to 40% by weight based on the total amount of the resin, and (3) a melt viscosity as measured at 240° C. of from 2,000 to 15,000 poise.

Now, the present invention will be described in detail with reference to the preferred embodiments.

The main component of the copolyamide in the present invention is a polyamide obtained by poly-condensation of e.g. a lactam of an at least three-membered ring, a polymerizable ω-amino acid or a dibasic acid with a diamine. Specifically, starting materials for such a polyamide include lactams such as ε-caprolactam, enantholactam, capryllactam, lauryllactam, α-pyrrolidone and α-piperidone, ω-amino acids such as 6-aminocaproic acid, 7-aminoheptanoic acid, 9-aminononanoic acid and 11-aminoundecanoic acid, dibasic acids such as adipic acid, glutaric acid, pimelic acid, suberic acid, azelaic acid, sebacic acid, undecanedioic acid, dodecanedioic acid, hexadecanedioic acid, hexadecenedioic acid, eicosanedioic acid, eicosadienedioic acid, diglycollic acid, 2,2,4-trimethyladipic acid, xylylene dicarboxylic acid, 1,4-cyclohexane dicarboxylic acid, terephthalic acid and isophthalic acid, and diamines such as hexamethylenediamine, tetramethylenediamine, nonamethylenediamine, undecamethylenediamine, dodecamethylenediamine, 2,2,4 (or 2,4,4)-trimethylhexamethylenediamine, bis-(4,4'-aminocyclohexyl)methane and m-xylylenediamine.

Specific examples of such polyamides include, for example, nylon 4, 6, 7, 8, 11, 12, 6.6, 6.9, 6.10, 6.11, 6.12, 6T, 6/6.6, 6/12 and 6/6T.

The hydrocarbon groups having from 6 to 22 carbon atoms present at the terminals of the copolyamide of the present invention include aliphatic hydrocarbon groups such as a hexyl group, a heptyl group, an octyl group, a 2-ethylhexyl group, a nonyl group, a decyl group, an undecyl group, a dodecyl group, a tridecyl group, a tetradecyl group, a tetradecylene group, a pentadecyl group, a hexadecyl group, a heptadecyl group, an octadecyl group, an octadecylene group, an eicosyl group and a docosyl group, alicyclic hydrocarbon groups such as a cyclohexyl group, a methylcyclohexyl group and a cyclohexylmethyl group, and aromatic hydrocarbon groups such as a phenyl group, a toluyl group, a benzyl group and a β-phenylethyl group.

These hydrocarbon groups are introduced by using monocarboxylic acids having from 7 to 23 carbon atoms as described hereinafter, during the preparation of the polyamide.

Terminal groups of the polyamide include, in addition to the above hydrocarbon groups, amino groups and/or carboxyl groups derived from the above-mentioned starting materials of the polyamide.

The hydrocarbon groups are determined by hydrolyzing the polyamide with hydrochloric acid, followed by the measurement by gas chromatography. The amino groups are determined by dissolving the polyamide in phenol, followed by titration with 0.05N hydrochloric acid. Likewise, the carboxyl groups are determined by dissolving the polyamide in benzyl alcohol, followed by titration with 0.1N sodium hydroxide.

The total number of terminal groups is the sum of the numbers of the above-mentioned hydrocarbon groups, amino groups and/or carboxyl groups.

In the present invention, the number of the above-mentioned hydrocarbon groups is at least 25 equivalent %, preferably at least 30 equivalent %, based on the total number of terminal groups. If this number is too small, no adequate improvement of the releasability is obtainable. On the other hand, the production will not be easy if the proportion of hydrocarbon groups is to be brought close to 100% based on the total number of terminal groups. Therefore, from the industrial point of view, the proportion of hydrocarbon groups is preferably from 40 to 95 equivalent %, more preferably from 50 to 90 equivalent %.

To produce the copolyamide of the present invention, the above-mentioned starting materials for a polyamide is subjected to poly-condensation in the presence of a monocarboxylic acid having from 7 to 23 carbon atoms, a diamine having from 2 to 22 carbon atoms and a dimerized fatty acid. In this poly-condensation, a dimerized amine may also be present.

The monocarboxylic acid is preferably the one having from 12 to 18 carbon atoms. Such monocarboxylic acid includes aliphatic monocarboxylic acids such as enanthic acid, caprylic acid, capric acid, pelargonic acid, undecanoic acid, lauric acid, tridecanoic acid, myristic acid, myristoleic acid, palmitic acid, stearic acid, oleic acid, linolic acid, arachic acid and behenic acid, alicyclic monocarboxylic acids such as cyclohexanecarboxylic acid and methylcyclohexanecarboxylic acid, and aromatic monocarboxylic acids such as benzoic acid, toluylic acid, ethylbenzoic acid and phenylacetic acid. Further, in the reaction for the production of the polyamide, derivatives which are capable of performing the same function as the above acids, such as acid anhydrides, esters or amides, may also be used.

The diamine having from 2 to 22 carbon atoms includes aliphatic diamines such ethylenediamine, trimethylenediamine, tetramethylenediamine, pentamethylenediamine, hexamethylenediamine, heptamethylenediamine, octamethylenediamine, nonamethylenediamene, decamethylenediamine, undecamethylenediamine, dodecamethylenediamine tridecamethylenediamine, hexadecamethylenediamine, octadecamethylenediamine and 2,2,4 (or 2,4,4)-trimethylhexamethylenediamine, alicyclic diamines such as cyclohexanediamine, methylcyclohexanediamine and bis-(4,4'-aminocyclohexyl)methane, and aromatic diamines such as xylylenediamine.

Further, during the polymerization, an aliphthatic dicarboxylic acid, such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, hexadecanedioic acid, hexadecenedioic acid, octadecanedioic acid, octadecenedioic acid, eicosanedioic acid, eicocenedioic acid, docosanedioic acid or 2,2,4-trimethyladipic acid, an alycyclic dicarboxylic acid such as 1,4-cyclohexanedicarboxylic acid, or an aromatic dicarboxylic acid such as terephthalic acid, isophthalic acid, phthalic acid or xylylene dicarboxylic acid may be added to an extent not to impair the physical properties.

The monocarboxylic acid is used in an amount of from 20 to 150 $\mu$eq/g, preferably from 25 to 100 $\mu$eq/g, as the amount of carboxyl groups relative to the starting materials for the polyamide.

In the present invention, the dimerized fatty acid component is introduced preferably by using a polymerized fatty acid obtained by polymerizing a fatty acid such as a saturated, ethylenically unsaturated, acetylenically unsaturated, natural or synthetic monobasic aliphatic acid having from 8 to 24 carbon atoms. As a specific example of such dimerized fatty acid, a dimer of linolenic acid may be mentioned.

Commercially available polymerized fatty acids usually contain, in addition to the main component of a dimerized fatty acid, other components such as a monomer acid used as the starting material and a trimerized fatty acid. Among them, preferred are those containing at least 70% by weight of the dimerized fatty acid. More preferred are those containing at least 95% by weight of the dimerized fatty acid, and still further preferred are those containing at least 98% by weight of the dimerized fatty acid. The monomer acid contained therein should be taken into consideration for the production of the polyamide resin of the present invention, since such a monomer acid can be used as the above-mentioned monocarboxylic acid to be used in the present invention. Further, such a commercially available polymerized fatty acid may be subjected to distillation to increase the content of the dimerized fatty acid before use. It may further be subjected to hydrogenation before use.

The content of the dimerized fatty acid in the polyamide resin is from 0.1 to 40% by weight, preferably from 0.5 to 30% by weight. If the content is too low, no adequate improvement in the impact resistance at low temperatures will be obtained. On the other hand, if the content is too high, the melt viscosity will be too low to be useful for injection molding.

The melt viscosity of the polyamide resin of the present invention is from 2,000 to 15,000 poise, preferably from 4,000 to 10,000 poise, as measured at 240° C. If the melt viscosity is too low, the physical properties of the molded product will be inferior. On the other hand, if the melt viscosity is too high, the molding will be difficult.

The reaction for the production of the polyamide of the present invention may be initiated by a usual method by using the above-mentioned starting materials for a polyamide, and the above-mentioned carboxylic acid and/or amine may be added at an optional stage from the initiation of the reaction to the commencement of a reaction under reduced pressure. The carboxylic acid and the amine may be added simultaneously or separately.

To obtain a molded product as the final product, pellets of the polyamide prepared as described above, is supplied to a molding machine such as an injection, extrusion, blow or compression molding machine and molded in accordance with a usual method. Particularly useful are cooling fans, radiator tanks, cylinder head covers, oil fans, gears, valves, brake pipes, canisters, fuel pipes, other tubes and pipes, other parts for waste gas system, electrical parts such as connectors and sheets obtained by injection molding or extrusion molding. Further, a secondary treatment such as vapor deposition may be applied to the molded products thus obtained.

Further, a reinforcing material such as glass fiber or carbon fiber, a filler such as clay, silica, alumina, silica-alumina, silica-magnesia, glass-beads, asbestos, graphite or gypsum and a conventional additive such as a dye, a pigment, a flame retardant, an antistatic agent, a copper compound or an untioxidant may be incorporated to the polyamide resin of the present invention.

Now, the present invention will described in further detail with reference to Examples. However, it should be understood that the present invention is by no means restricted to such specific Examples.

The physical properties of the test pieces described in the Examples and Comparative Examples were measured in accordance with the following methods:

(1) Tensil test: In accordance with ASTM D638
(2) Flexural test: In accordance with ASTM D790
(3) Izod impact test: In accordance with ASTM D256
(4) Melt viscosity: By using a flow tester (CFT500A manufactured by Shimadzu Corporation), $\mu$a at a sharing speed of 100 (sec$^{-1}$) at 240° C. was read out.
(5) Releasability: By using a lattice-like die of 80 mm x 80 mm x 30 mm having four ribs at intervals of 15 mm in both lengthwise and transverse directions, injection molding was conducted at 250° C. at a die temperature of 40° C., and on the tenth shot, the cooling time where no deformation took place was read out and taken as an index for releasability (injection: 5 seconds).

EXAMPLES 1 to 6 and COMPARATIVE EXAMPLES 1 to 3

Into a 200 liter autocrave, 60 kg of $\epsilon$-caprolactam, 4.0 kg of water and a monocarboxylic acid, Empole 1014 (tradename for a polymerized fatty acid manufactured by Uniliver Emery Company) and a diamine in the respective amounts as identified in Table 1 and talc (500 ppm) were charged. Then, the autocrave was flushed with nitrogen and closed, and the reaction was conducted at 270° C. under a pressure of 14 KG for three hours under stirring. Then, the pressure was gradually released and brought to a reduced pressure level as identified in Table 1, whereupon the reaction was conducted under reduced pressure for two hours.

The stirring was stopped, and nitrogen was introduced to a normal pressure. The product was withdrawn in the form of a strand and pelletized. By using boiling water, an unreacted monomer was removed by extraction, followed by drying.

The polymer thus obtained had the composition and physical properties as identified in Table 1.

Empole 1014 (polymerized fatty acid) has the following composition:
Dimerized fatty acid: 93%
Trimerized fatty acid: ≦7%
Monocarboxylic acid: ≦1%

TABLE 1

|  |  | Example 1 | Example 2 | Example 3 |
|---|---|---|---|---|
| Monocarboxylic acid | | Stearic acid | Stearic acid | Stearic acid |
| Amount ($\mu$eq/g) | | 30 | 60 | 29 |
| Empole 1014 (Note 1) | | 0.83 | 0.83 | 2.07 |
| Amount (wt %) | | | | |
| Diamine | | Hexamethylene diamine | Hexamethylene diamine | Hexamethylene diamine |
| Amount ($\mu$eq/g) | | 59 | 89 | 103 |
| Reduced pressure level (torr) | | 300 | 170 | 180 |
| Analysed values | NH2 ($\mu$eq/g) | 29 | 19 | 20 |
|  | CO2H ($\mu$eq/g) | 38 | 21 | 22 |
|  | Terminal hydrocarbon groups (%) (Note 2) | 31 | 60 | 41 |
|  | Melt viscosity at 240° C. (poise) | 4,800 | 4,200 | 8,100 |
| Basic physical properties | Tensile Yield strength (kg/cm$^2$) | 760 | 750 | 790 |
|  | Breaking strength (kg/cm$^2$) | 630 | 680 | 670 |
|  | Elongation (%) | 137 | 165 | 172 |
|  | Flexural Strength (kg/cm$^2$) | 1,100 | 1,070 | 1,110 |
|  | Modulus (kg/cm$^2$) | 27,900 | 27,200 | 27,000 |
|  | ¼t″ Izod impact strength (kg.cm/cm) | 7.1 | 7.0 | 7.0 |
| Cooling time where no deformation takes place (sec.) | | 25 | 20 | 30 |

|  |  | Example 4 | Comparative Example 1 | Comparative Example 2 |
|---|---|---|---|---|
| Monocarboxylic acid | | Stearic acid | — | — |
| Amount ($\mu$eq/g) | | 20 | | |
| Empole 1014 (Note 1) | | 2.07 | 2.07 | 2.07 |
| Amount (wt %) | | | | |
| Diamine | | Hexamethylene diamine | Hexamethylene diamine | Hexamethylene diamine |
| Amount ($\mu$eq/g) | | 93 | 73 | 73 |
| Reduced pressure level (torr) | | 110 | 450 | 320 |
| Analysed values | NH2 ($\mu$eq/g) | 15 | 51 | 36 |
|  | CO2H ($\mu$eq/g) | 16 | 52 | 37 |
|  | Terminal hydrocarbon groups (%) (Note 2) | 40 | ≦1 | ≦1 |
|  | Melt viscosity at 240° C. (poise) | 12,800 | 4,700 | 8,500 |
| Basic physical properties | Tensile Yield strength (kg/cm$^2$) | 800 | 750 | 800 |
|  | Breaking strength (kg/cm$^2$) | 690 | 620 | 680 |
|  | Elongation (%) | 180 | 125 | 165 |
|  | Flexural Strength (kg/cm$^2$) | 1,120 | 1,050 | 1,110 |
|  | Modulus (kg/cm$^2$) | 27,500 | 27,000 | 27,000 |
|  | ¼t″ Izod impact strength (kg.cm/cm) | 7.1 | 6.0 | 7.0 |
| Cooling time where no deformation takes place (sec.) | | 30 | 50 | 50 |

|  |  | Example 5 | Example 6 | Example 7 |
|---|---|---|---|---|
| Monocarboxylic acid | | Stearic acid | Stearic acid | — |
| Amount ($\mu$eq/g) | | 88 | 65 | |
| Empole 1014 (Note 1) | | 4.15 | 24.9 | 24.9 |
| Amount (wt %) | | | | |
| Diamine | | Hexamethylene diamine | Hexamethylene diamine | Hexamethylene diamine |
| Amount ($\mu$eq/g) | | 234 | 944 | 879 |
| Reduced pressure level (torr) | | 140 | 120 | 400 |
| Analysed values | NH2 ($\mu$eq/g) | 18 | 15 | 47 |
|  | CO2H ($\mu$eq/g) | 17 | 18 | 47 |
|  | Terminal hydrocarbon groups (%) (Note 2) | 70 | 65 | 9 |
|  | Melt viscosity at 240° C. (poise) | 3,200 | 4,600 | 5,000 |
| Basic physical properties | Tensile Yield strength (kg/cm$^2$) | 580 | 310 | 330 |
|  | Breaking strength (kg/cm$^2$) | 570 | 470 | 480 |
|  | Elongation (%) | 185 | >200 | >200 |
|  | Flexural Strength (kg/cm$^2$) | 920 | 430 | 450 |
|  | Modulus (kg/cm$^2$) | 22,300 | 11,700 | 12,100 |
|  | ¼t″ Izod impact strength (kg.cm/cm) | 6.8 | 10.8 | 10.3 |
| Cooling time where no deformation takes place | | 45 | 60 | Deformed even |

| (sec.) | $\geq 90$ |
|---|---|

Note 1: The amount of the dimerized acid in the polymer is 0.93 time of this value.
Note 2: Equivalent % of the hydrocarbon groups having from 6 to 22 carbon atoms based on the total number of terminal groups.

The polyamide resin of the present invention has excellent releasability and impact resistance at low temperatures and the change in the physical properties upon absorption of moisture is small. Therefore, it is valuable as a resin for various molded products.

What is claimed is:

1. A copolyamide resin containing a dimerized fatty acid as a copolymer component, which has (1) at least 25 equivalent %, based on the total number of terminal groups, of hydrocarbon groups having from 6 to 22 carbon atoms at its terminals, (2) a content of a dimerized fatty acid of from 0.1 to 40% by weight based on the total amount of the resin, and (3) a melt viscosity as measured at 240° C. of from 2,000 to 15,000 poise.

2. The copolyamide resin according to claim 1, wherein the copolyamide resin is a copolymer comprising polycapramide or polyhexamethyleneadipamide as the main component.

3. The copolyamide resin according to claim 1, which is obtained by copolymerizing (a) a polyamide forming material, (b) a dimerized fatty acid, (c) a diamine and (d) a monocarboxylic acid having from 7 to 23 carbon atoms.

4. The copolyamide resin according to claim 3, wherein the polyamide forming material (a) is ε-caprolactam or hexamethylenediamine and adipic acid.

5. The copolyamide resin according to claim 3, wherein the dimerized fatty acid (b) is a polymerized fatty acid containing at least 70% by weight of a dimerized fatty acid.

6. The copolyamide resin according to claim 3, wherein the dimerized fatty acid (b) is a polymerized fatty acid containing at least 95% by weight of a dimerized fatty acid.

7. The copolyamide resin according to claim 3, wherein the dimerized fatty acid (b) is a polymerized fatty acid containing at least 98% by weight of a dimerized fatty acid.

8. The copolyamide resin according to claim 3, wherein the diamine (c) is a diamine having from 2 to 22 carbon atoms.

9. The copolyamide resin according to claim 3, wherein the diamine (c) is hexamethylenediamine.

10. The copolyamide resin according to claim 3, wherein the monocarboxylic acid (d) is a monocarboxylic acid having from 12 to 18 carbon atoms.

11. The copolyamide resin according to claim 3, wherein the monocarboxylic acid (d) is stearic acid.

12. The copolyamide resin according to claim 3, wherein the monocarboxylic acid (d) is reacted in an amount of from 20 to 150 μeq/g relative to the polyamide forming material (a).

13. The copolyamide resin according to claim 3, wherein the monocarboxylic acid (d) is reacted in an amount of from 25 to 100 μeq/g relative to the polyamide forming material (a).

14. The copolyamide resin according to claim 1, wherein the content of dimerized fatty acid is from 0.5 to 30% by weight based on the total amount of the resin.

* * * * *